United States Patent [19]

Kanno et al.

[11] Patent Number: 5,231,623
[45] Date of Patent: Jul. 27, 1993

[54] OPTICAL DISK DRIVE APPARATUS

[75] Inventors: Tetsuo Kanno, Ebina; Yoshiaki Aota, Atsugi, both of Japan

[73] Assignee: Ricoh Company, Ltd., Tokyo, Japan

[21] Appl. No.: 585,732

[22] Filed: Sep. 20, 1990

[30] Foreign Application Priority Data

Sep. 25, 1989 [JP] Japan .................. 1-246535

[51] Int. Cl.$^5$ .......................................... G11B 33/14
[52] U.S. Cl. .................................. 369/75.2; 369/71; 369/72; 369/75.1
[58] Field of Search ............ 369/75.1, 75.2, 77.1, 369/77.2, 79, 292, 71, 72; 360/99.01, 99.02, 99.06, 99.07; 361/344, 378, 379, 381, 383

[56] References Cited

U.S. PATENT DOCUMENTS

| 4,642,715 | 2/1987 | Ende | 360/47.02 |
| 4,675,858 | 6/1987 | d'Alayer de Costemore d'Arc | 369/77.1 |
| 4,723,185 | 2/1988 | Maeda | 369/77.2 |
| 4,727,444 | 2/1988 | Fukushima et al. | 369/75.2 |
| 4,736,356 | 4/1988 | Konshak | 369/79 |
| 4,785,365 | 11/1988 | Ohkita | 369/77.1 |
| 4,815,065 | 3/1989 | Rouws | 369/75.2 |
| 4,816,945 | 3/1989 | Watanabe | 360/99.07 |
| 4,829,504 | 5/1989 | Sonaga et al. | 369/75.2 |
| 4,878,138 | 10/1989 | Ando et al. | 360/99.02 |
| 4,882,722 | 11/1989 | Matsuura et al. | 369/75.2 |

FOREIGN PATENT DOCUMENTS

| 1185840 | 7/1989 | Japan | 369/71 |
| 2239494 | 9/1990 | Japan | 369/292 |

OTHER PUBLICATIONS

IBM Technical Disclosure Bulletin—Cooling Electrical Equipment—vol. 20 No. 6 Nov. 1977.

Primary Examiner—Eugene R. LaRoche
Assistant Examiner—Tan Nguyen
Attorney, Agent, or Firm—Cooper & Dunham

[57] ABSTRACT

A sealing structure is provided for sealing the optical recording medium and at least a part of an access mechanism against an outside of the apparatus when the disk cartridge is mounted at a predetermined position within the apparatus.

8 Claims, 13 Drawing Sheets

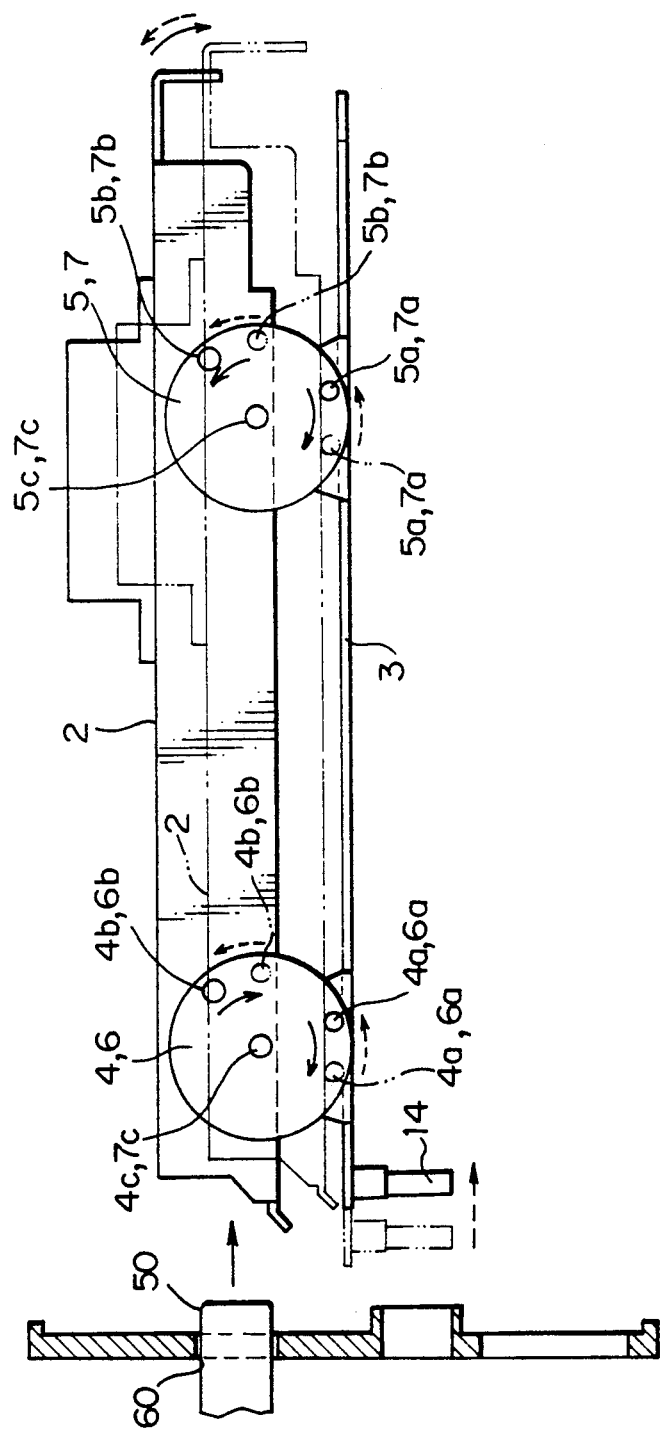

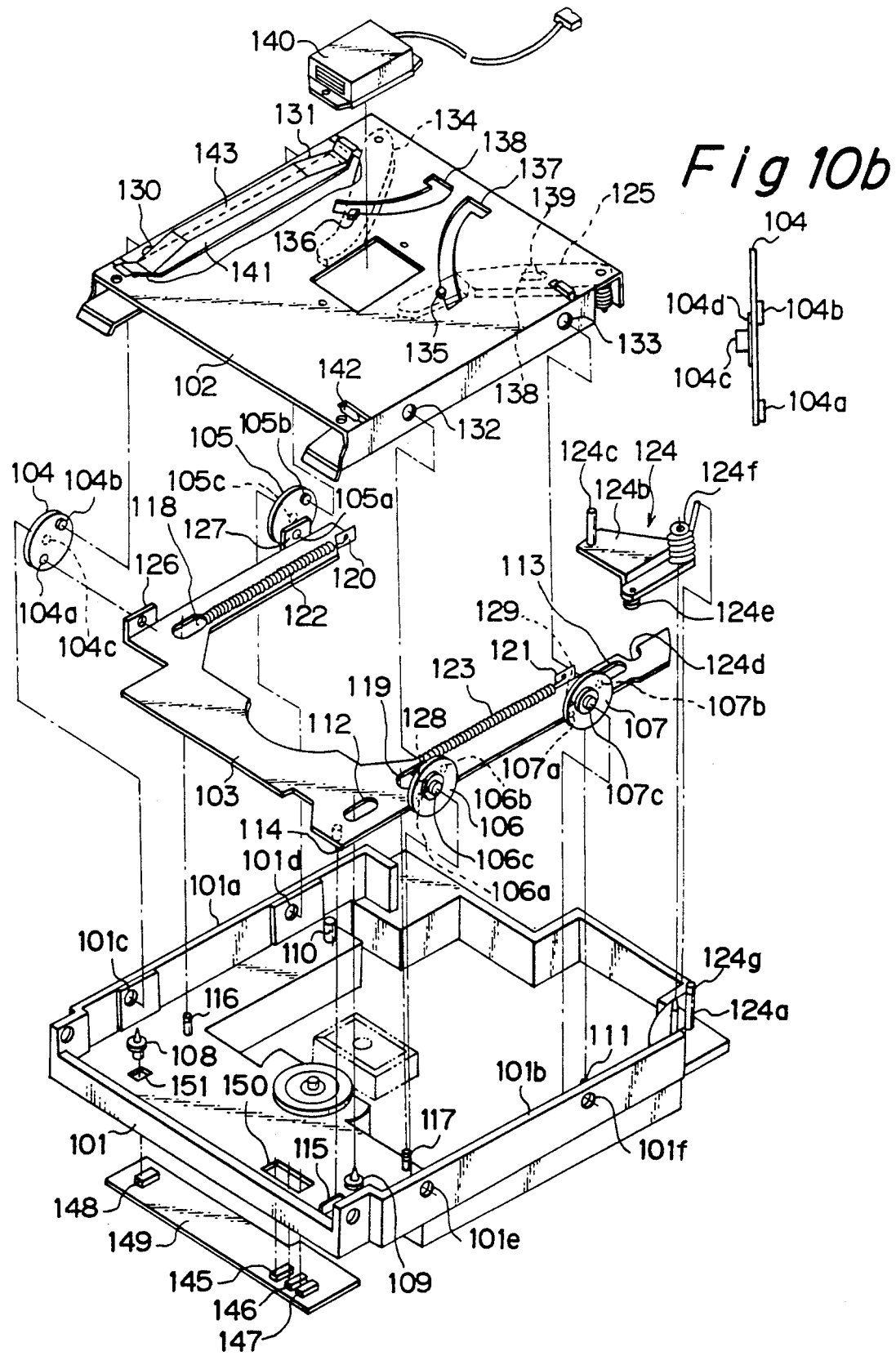

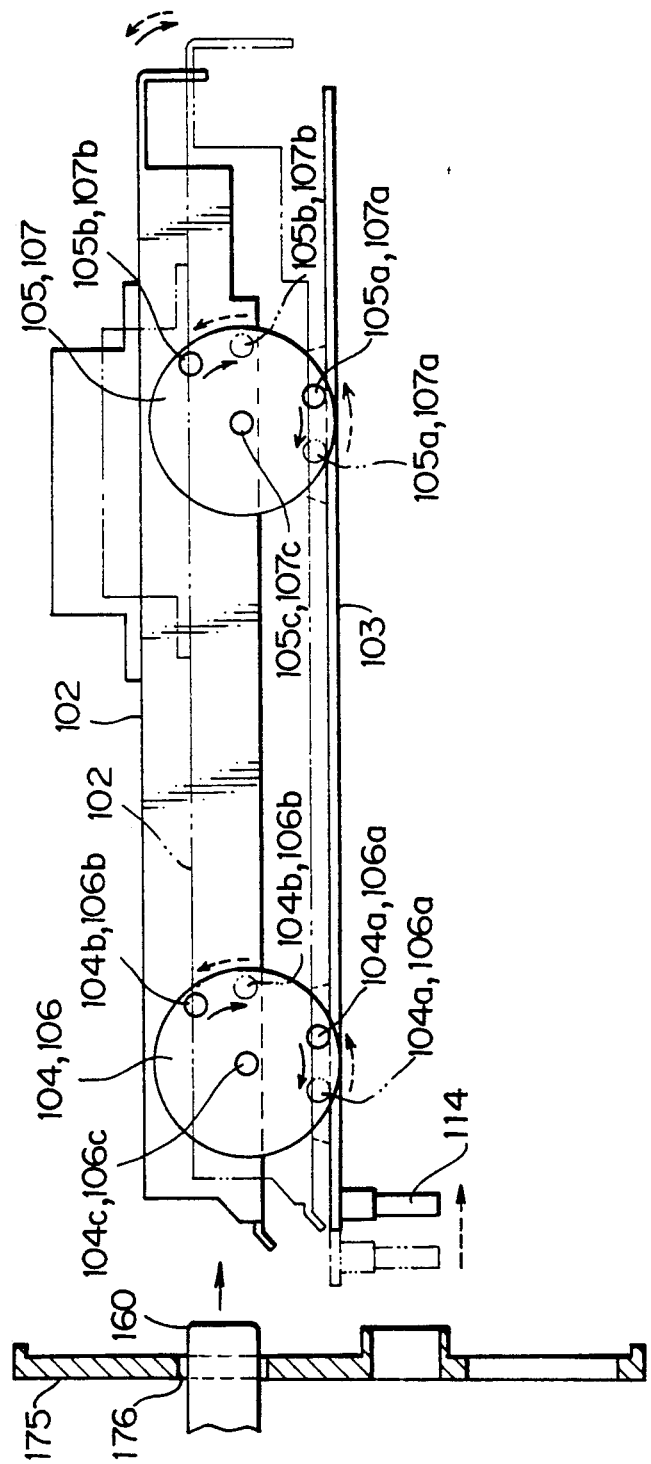

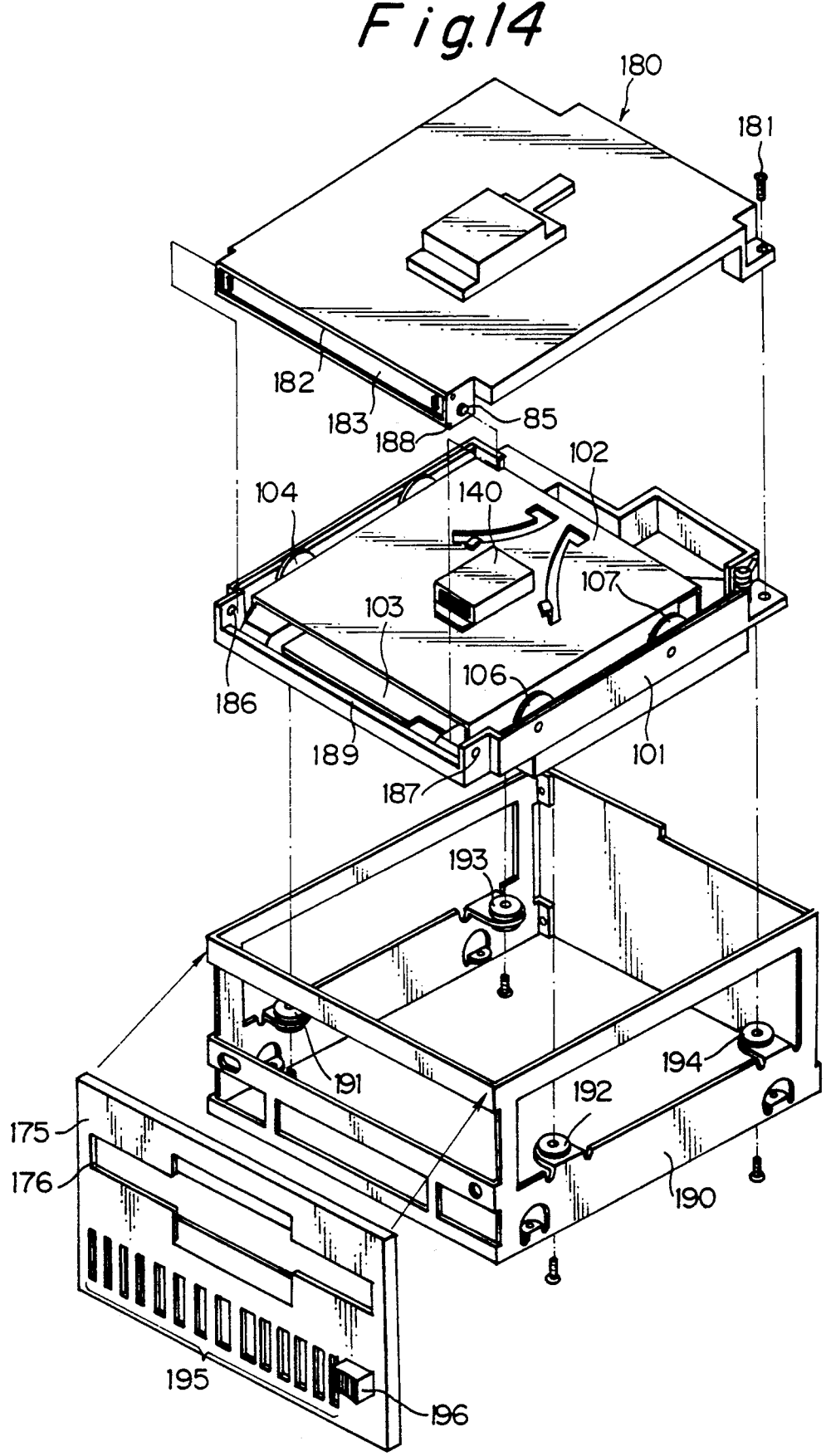

OPTICAL DISK DRIVE APPARATUS

BACKGROUND OF THE INVENTION

The present invention relates generally to an optical disk drive apparatus. More particularly, the invention relates to an improvement of an optical disk drive apparatus of a disk-exchangeable type in which a disk cartridge enclosing therein an optical recording medium such as optical disk or magneto-optical disk is exchangeably inserted into the disk drive apparatus.

Generally, in a disk drive apparatus of a disk-exchangeable type in which a disk cartridge enclosing therein an optical recording medium such as optical disk or magneto-optical disk is manually exchangeable with respect to a body of the disk drive apparatus, an ejecting operation for the disk cartridge from the disk drive apparatus is carried out by, for example, pushing an ejection button which projects from a front panel of the disk apparatus.

For this purpose, the disk drive apparatus is equipped with a disk loading mechanism including an ejecting means. When the ejection button is pushed, the ejection means of the loading mechanism serves to move upward the disk cartridge in order to remove the optical recording medium from a turn table attached to the tip end of a spindle motor which drives the optical recording medium for rotation, and then, the disk cartridge is ejected outward from the disk drive apparatus.

In an exemplary optical disk drive apparatus, when the ejecting button is pushed in the state that the spindle motor is operated to rotate the optical recording medium, the operation of the spindle motor is stopped after the disk cartridge is ejected. Therefore, when the disk cartridge is moved upward in the state that the optical recording medium is held for rotation on the turn table of the spindle motor, the optical recording medium collides with a central projecting portion formed on the disk cartridge while rotating within the cartridge, resulting in a generation of wear dust from the optical recording medium and the projecting portion of the cartridge. The wear dust may be attached to the recording surface of the optical recording medium or the surface of optical parts of an optical pickup head, causing the optical disk drive apparatus to generate a data error.

In order to reduce the amount of wear dust, it has been proposed an optical recording medium which is provided at a central portion thereof with a guard ring made of a material having wear-resistance properties, so that when the ejection operation is performed in the state that the spindle motor is operated, the guard ring can collide with the projecting portion of the disk cartridge.

Even in this case, however, the generation of wear dust from the projecting portion can not be prevented, and wear dust may also be generated from the guard ring, even though its amount is very little.

In order to prevent the generation of wear dust, it has been also proposed a optical disk drive apparatus comprising an ejection locking mechanism which uses, for example, a solenoid and is operative to lock the ejection means of the disk loading mechanism so as not to perform the ejection operation when the spindle motor is operated.

However, such an apparatus suffers from a disadvantage in that the ejection locking mechanism and the ejecting means of the loading mechanism may be suffered from a damage due to an excessive force applied to the ejection button when the ejection means is locked.

On the other hand, the optical disk drive apparatus of a disk-exchangeable type has many portions, each of which communicates the interior of the apparatus with the atmosphere, causing the atmosphere to flow into the interior thereof. In such a construction, dust contained in the atmosphere may be also attached to the surface of the recording medium or the surface of the optical parts of the optical pickup head, causing the optical disk drive apparatus to generate a data error.

In order to prevent the invasion of dust into the interior of the drive apparatus, it is considered to seal the whole of the disk drive apparatus with a surrounding cover.

In this case, however, the disk drive apparatus are provided at the inside thereof with many heat generating sources such as a laser diode which is used as a light source of the optical pickup head, a seek motor which serves to move the optical pickup head, a drive motor for moving objective lens of the optical pickup head, a spindle motor for rotating the optical recording medium, and driving circuits of these elements. Therefore, when the whole of the drive apparatus is sealed with the surrounding cover from the outside, a temperature in the interior of the drive apparatus tends to rise over a permissible temperature of the optical disk or the constituent elements of the disk drive apparatus, resulting in a deterioration thereof.

In order to restrain the rise of temperature in the interior of the disk drive apparatus, it is considered to forcedly cool the interior of the disk drive apparatus with the atmosphere drawn thereinto. However, when the atmosphere is drawn into the disk drive apparatus, dust contained in the atmosphere is also drawn into the apparatus, whereby the above-mentioned problems of dust may remarkably occur.

Further, when the speed of operation of the disk drive apparatus is increased, the amount of heat generated from the motors increases due to an increase of the amount of consumption of electric power of each of the above-mentioned motors and the drive circuits, resulting in a mach more rise of temperature in the disk drive apparatus.

Namely, in the case of an optical disk drive apparatus sealed with a surrounding cover, when the sealing degree is increased, the influence of the dust may be reduced due to a decrease of the amount of the atmosphere drawn into the apparatus, but the temperature in the interior of the apparatus rises over the permissible temperature. To the contrary, when the amount of the atmosphere is increased to reduce the rise of temperature in the interior of the apparatus, the influence of dust remarkably occurs, so that it has been difficult to realize simultaneously both the reduction of rise of temperature and the influence of dust.

SUMMARY OF THE INVENTION

It is therefore an object of the present invention to provide an optical disk drive apparatus which makes it possible to decrease the possibility of generation of a data error caused by the influence of dust without generation of any other inconveniences.

Another object of the invention is to provide an optical disk drive apparatus having an ejection locking mechanism which can decrease the possibility of generation of wear dust and which is not damaged even when an ejection operation is performed in an ejection locking state.

Further object of the invention is to provide an optical disk drive apparatus which simultaneously decreases both the possibility of generation of a data error caused by the influence of dust and the rise of temperature.

According to one aspect of the present invention, it is provided an optical disk drive apparatus comprising a disk loading mechanism which includes means for ejecting an exchangeable disk cartridge enclosing therein an optical recording medium from the apparatus, an ejection button for operating the ejecting means, and means for locking the ejecting means, the locking means including: an ejection arm connected to the ejection button and movable between an engaging position at which the ejection arm is interlocked with the ejecting means and a disengaging position at which the ejection arm is disconnected from the ejecting means; means for displacing the ejection arm, the displacing means being operatively connected to the ejection arm and being movable between a locking position at which the ejection arm is kept at the disengaged position and a lock-releasing position at which the ejection arm is kept at the engaging position; and means for controlling the displacing means, the controlling means being operative to keep the displacing means at the locking position when a spindle motor for rotating the optical recording medium is rotated and at the lock-releasing position when the spindle motor is stopped.

In the apparatus having the above-mentioned construction, when the ejecting means is locked with the locking means, the ejection arm is held in disengagement with respect to the ejecting means, and accordingly, when the ejection button is operated in the state that the ejecting means is locked, no force is transferred from the ejection button to the ejecting means, thereby preventing the locking means and ejecting means from being damaged when the ejecting means is held in the locked state. Moreover, since the displacing means is kept at the locking position when a spindle motor is rotated and at the lock-releasing position when the spindle motor is stopped, the disk cartridge can be prevented from being forcedly ejected when the recording disk in the disk cartridge is rotated by the spindle motor.

Preferably, the disc drive apparatus further comprises means for detecting that the ejection button is operated when the displacing means is kept at the locking position. In this case, the controlling means is responsible to the detecting means to stop rotation of the spindle motor when an operation of the ejection button is detected. Accordingly, when the ejection button is operated in the state that the spindle motor is rotated, it is possible to move the displacing means to the lock-releasing position after rotation of the spindle motor is stopped.

According to another aspect of the present invention, it is provided an optical disk drive apparatus comprising: a disk loading mechanism for detachably mounting an exchangeable disk cartridge on a predetermined position; an access mechanism including an optical pickup head for recording data on and/or reproducing data from an optical recording medium enclosed within the disk cartridge and drive means for moving the optical pickup head with respect to the optical recording medium; and means for sealing the optical recording medium and at least a part of the access mechanism *against* the outside of the apparatus when the disk cartridge is mounted on the predetermined position.

In the apparatus having the above-mentioned construction, since the optical disk and the access mechanism are sealed from the outside of the apparatus, it is possible to prevent dust in the atmosphere from being attached to the optical recording medium and optical parts of the optical pickup head of the access mechanism even when the atmosphere for cooling is introduced in the interior of the apparatus. Accordingly, it is possible to decrease a possibility of generation of a data error caused by the influence of dust while electively cooling the interior of the apparatus with the atmosphere drawn thereinto. Further, in the above-mentioned construction, only a part of the heat generating elements is enclosed in the sealing means, while the sealing means is cooled by the atmosphere which flows in contact with the outer surface of the sealing means. Accordingly, the rise of temperature in the interior of the sealing structure can be restricted.

Preferably, the sealing means includes: a chassis having a recess for receiving therein the access mechanism and the disk loading mechanism; a chassis cover for sealingly covering the recess of the chassis, the chassis cover being formed at a front face thereof with an aperture through which the disk cartridge is inserted into the chassis cover; and a door provided at the front face of the chassis cover for opening and closing the aperture of the chassis cover.

Further objects, features and advantages of the present invention will become apparent from the following description of the preferred embodiments of the present invention as illustrated in the accompanying drawings.

BRIEF DESCRIPTION OF THE DRAWINGS

FIG. 4 is a schematical view for explaining an example of movement of a carrier and tray;

FIG. 10(a) is an exploded perspective view showing a disk loading mechanism according to another embodiment of the present invention;

FIG. 10(b) is a side view of a cam which is used in the disk loading mechanism shown in FIG. 10(a);

FIG. 13 is a schematical view for explaining an example of movement of a carrier and tray;

FIG. 14 is an exploded perspective view schematically showing a sealing structure applied to the apparatus shown in FIG. 10(a);

DESCRIPTION OF THE PREFERRED EMBODIMENTS

Figures 1A, 1B:
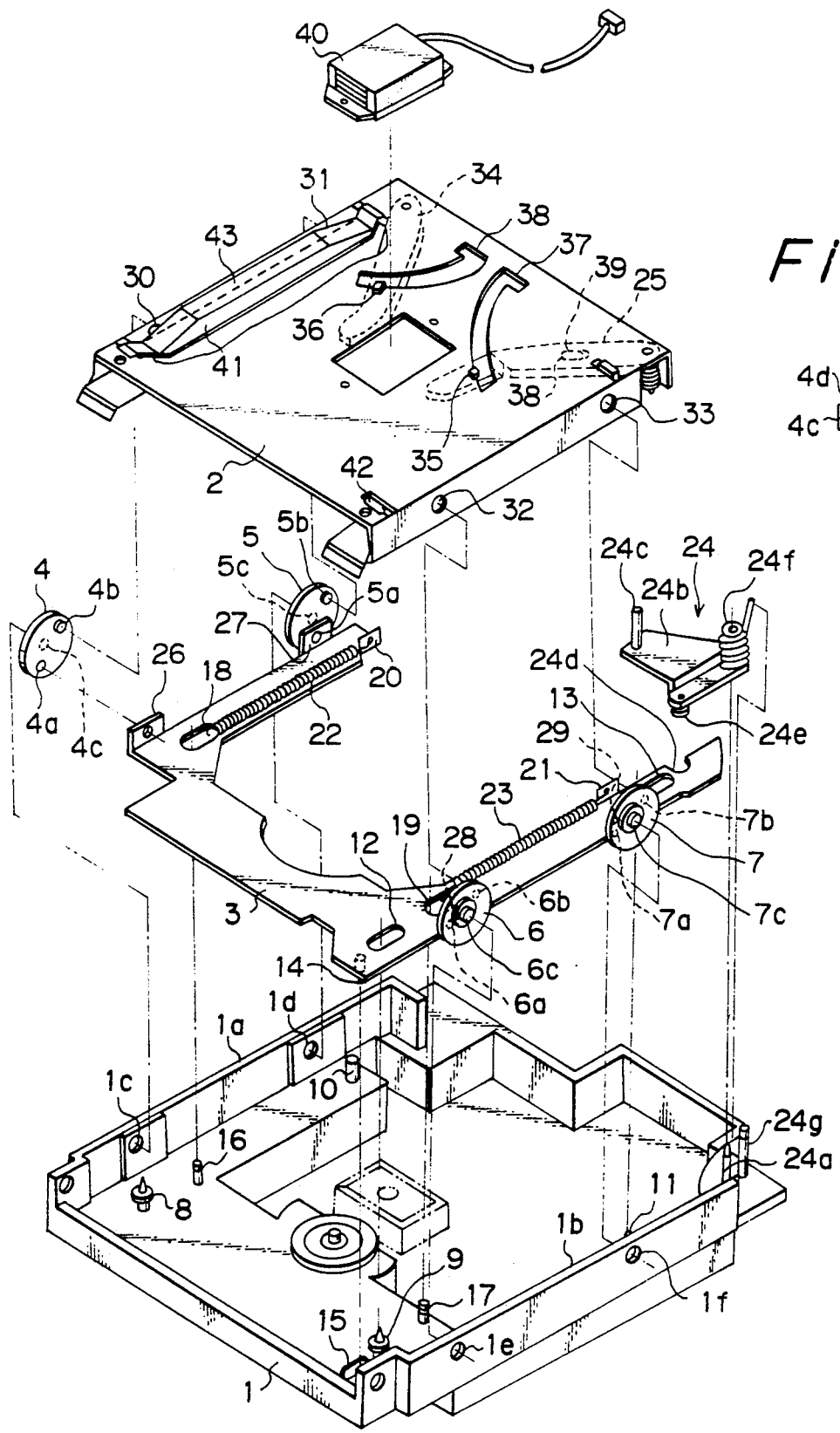
FIG. 1(a) is an exploded perspective view showing a disk loading mechanism according to one embodiment of the present invention applied to a magneto-optical disk drive apparatus.
FIG. 1(b) shows a side view of a cam which is used in the disk loading mechanism shown in FIG. 1(a)

Referring first to FIG. 1(a), there is shown a first embodiment of the disk loading mechanism according to the present invention which is applied to a magneto-optical disk drive apparatus.

In this embodiment, a casing 1 of the magneto-optical disk drive mechanism is equipped therein with a disk loading mechanism. The disk loading mechanism comprises a tray 2 for supporting a disk cartridge, a carrier 3 which reciprocates in a direction of insertion/ejection of the disk cartridge, and a plurality of cams 4, 5, 6 and 7 which are operatively connected between the tray 2 and the carrier 3 for moving the tray 2 in the direction of insertion/ejection of the disk cartridge in interlock with the carrier 3.

The casing 1 is attached with height standard pins 8, 9, 10 and 11 for regulating the height of the disk cartridge. The carrier 3 is formed with long holes 12 and 13 in the insertion direction of the disk cartridge for escaping the height standard pins 9, 11 which are aligned in the front and rear direction at the right-hand side when they are seen in the insertion direction of the disk cartridge.

At a further forward side from the long hole 12 positioned at the forward side of the carrier 3, an ejecting pin 14 for pushing the carrier 3 at the time of ejecting the disk cartridge is disposed such that it projects at the lower face of the carrier 3. The casing 1 is formed with a long hole 15 for escaping the ejecting pin 14.

Provided at the rear side of the height standard pins 8 and 9 are pins 16 and 17, respectively, while long holes 18 and 19 are formed with on the carrier 3 so as to escape the pins 16 and 17. Springs 22 and 23 for applying an urging force to the carrier 3 in the ejection direction are hooked between the pins 16 and 17 projecting from the long holes 18 and 19 and hooks 20 and 21 provided on the rear portion of the carrier 3.

The urging force is engageably received by the latch mechanism 24 provided at the rear side of the long hole 13 in the state that the disk cartridge is not mounted.

The latch mechanism 24 comprises a shaft 24a provided on the casing 1, a latch plate 24b rotatably provided on the shaft 24a, a latch pin 24c attached to the latch plate 24b such that it is engageable to a lever 25 provided on the tray 2, a latch roller 24e engageably provided on a notched portion 24d which is formed on the carrier 3 and a helical latch spring 24f for urging the latch plate 24b in the engaging direction. One end of the latch spring 24f engages one end of the latch plate 24b, while the other end thereof engages a pin 24g provided adjacent to the shaft 24a.

Provided on the side edge of the carrier 3 at the front, rear, left, and right positions are rising-up portions 26, 27, 28 and 29, respectively. As shown in FIG. 1(b), operating shafts 4a, 5a, 6a and 7a of the cams 4, 5, 6 and 7 provided at one side thereof are fixedly inserted into the rising-up portions 26, 27, 28 and 29, respectively. Other operating shafts 4b, 5b, 6b and 7b of the cams 4, 5, 6 and 7 provided at one side thereof are fixedly inserted into holes 30, 31, 32 and 33 provided on the outside portion of the tray 2. The holes 31 and 33 are formed as long holes so as to absorb the installing accuracy.

Rocking shafts 4c, 5c, 6c and 7c formed at the side opposite to the side on which the operating shafts of the cams 4, 5, 6 and 7 are provided are fixedly inserted into holes 1c, 1d, 1e and 1f bored on the side plates 1a and 1b upright on the side of the casing 1.

With this construction, the cams 4, 5, 6 and 7 are rotatably attached to the casing 1 and interlock the tray 2 with the carrier 3, and thereby, the movement of the tray 2 is regulated only in the direction regulated by the cams 4, 5, 6 and 7.

Provided on the base portions of the rocking shafts 4c, 5c, 6c and 7c of the cams 4, 5, 6 and 7 are projecting portions 4d, 5d, 6d and 7d, respectively (see FIG. 1(b)), which serve to decrease a contact area with the casing 1 and thereby to reduce frictional force. Furthermore, by using resin having small frictional ratio such as polyacetals as a material of the cams 4, 5, 6 and 7, it is arranged to make the friction coefficient on the contact faces of the cams 4, 5, 6 and 7 as small as possible. The tray 2 is also provided with holes (not shown) for escaping the height standard pins 8 and 9.

The tray 2 is generally formed so that it embraces the disk cartridge from upper side and lateral sides. Both lower sides at housing inlet for the disk cartridge are formed so as to be bent downward.

Provided at the inside of the tray 2 are rotatable levers 25 and 34 which serves to open and close a shutter of the disk cartridge, as described later. These levers 25 and 34 are given a urging force in the outward direction. Further, anchor members 35 and 36 provided on the upper faces of the levers 25 and 34, respectively, are anchored in guiding holes 37 and 38 formed on the tray 2 in the form of a band so as to form a part of an arc, whereby regulating the movement direction of the levers 25 and 34. The levers 25 and 34 are also constructed in such a manner that one of them is lowered at one step from the other thereof so that they cross in the course of their movement ranges.

The lever 25 is formed with a long hole 38 through which the latch pin 24c inserts and a notched portion 39 for making the long hole 38 pass the latch pin 24c.

Installed on the upper face of the tray 2 is a magnetic head 40 for generating an auxiliary magnetic field within the range of movement of an optical pickup head (not shown). Arranged at the inside of the tray 2 are junk members 41 and 42 which serves to hold the disk cartridge between their opposing sides and thereby to regulate the height of the disk cartridge. The junk members 41 and 42 are urged by plate springs 43 and 44, respectively (in the drawing, the plate spring 44 is not seen).

Figure 2A:
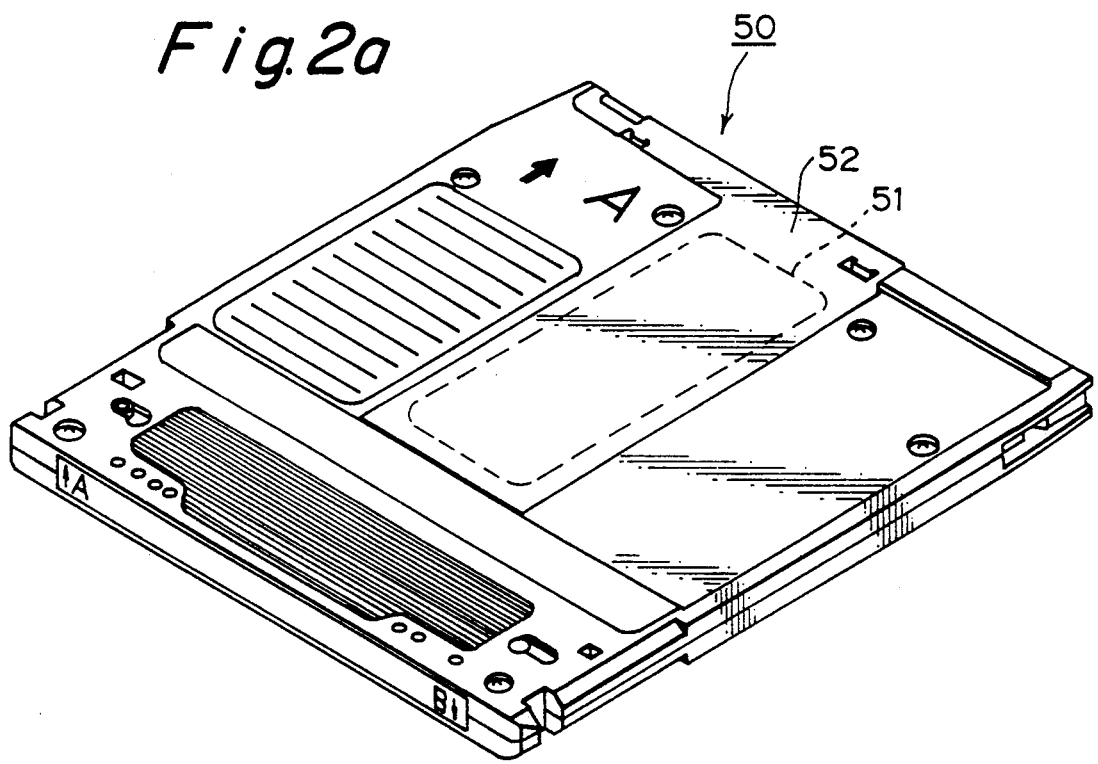
FIG. 2(a) is a perspective view showing an exemplary disk cartridge.
Figure 2B:
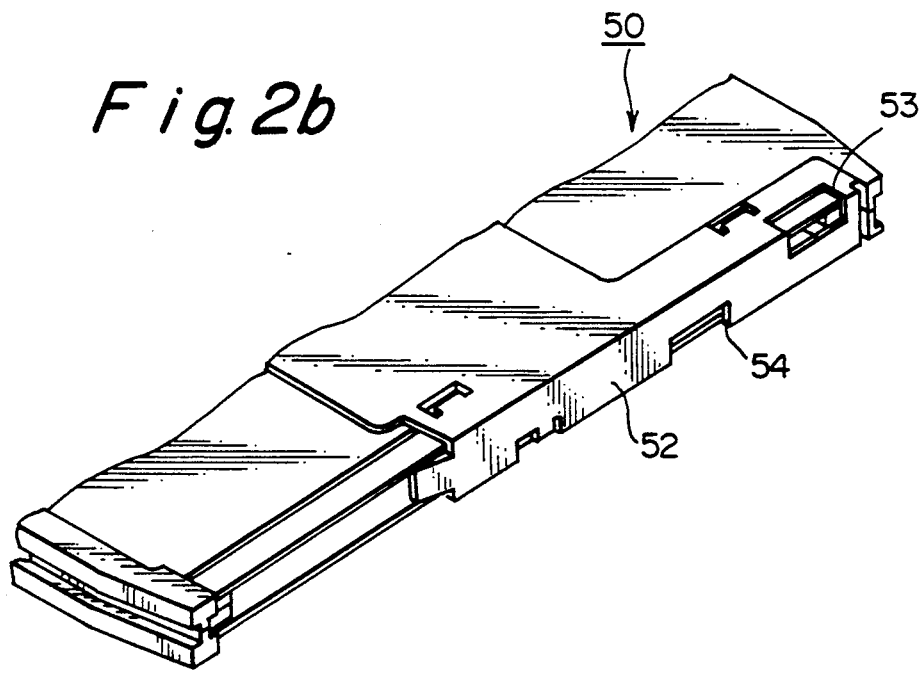
FIG. 2(b) is a fragmentary perspective view showing a shutter of the disk cartridge shown in FIG. 2(a)

FIGS. 2(a) and 2(b) show one example of the disk cartridge.

In these drawings, a long access window 51 is formed at almost center of the disk cartridge 50 in the insertion direction. A shutter 52 for opening and closing the access window 51 is attached to the disk cartridge 50 in such a manner that the shutter 52 can be folded back centering the top end of the disk cartridge 50.

The shutter 52 positioned at the top end of the disk cartridge 50 i formed with opening portions 53 and 54 into which the levers 25 and 34 are inserted.

Figure 3:
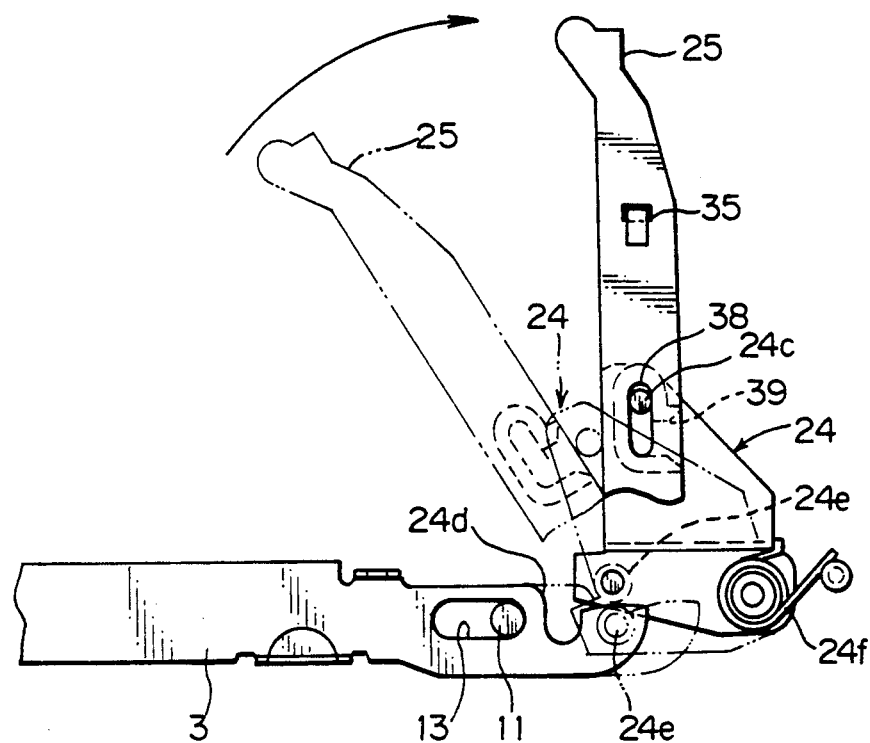
FIG. 3 is a schematical view for explaining an example of movement of a latch mechanism.

Under the above-mentioned construction, when the disk cartridge 50 is in the state that it is not housed in the tray 2 as shown by two-dotted line in FIG. 3, the latch roller 24e of the latch mechanism 24 is in the state that it drops in the notched portion 24d of the carrier 3, thereby the urging force of the ejecting springs 22 and 23 being anchored.

Moreover, in this state, the carrier 3 moves to the limit position of the insertion direction at the state of the insertion-waiting time, so that, as shown by a solid line in FIG. 4, the shafts 4b, 5b, 6b and 7b of the cams 4, 5, 6 and 7 are positioned at the highest positions and the tray 2 positions at the height where the housing inlet of the disk cartridge 50 corresponds to the insertion inlet 60 of the disk cartridge 50 of the magneto-optical disk drive apparatus.

In this state, when the disk cartridge 50 is inserted into the tray 2, the levers 25 and 34 are inserted into the opening portions 53 and 54 of the shutter 52 and the shutter 52 is gradually opened, and at the same time, the latch pin 24c enters into the long hole 38 through the notched portion 39 of the lever 25 in the course of the movement of the shutter 52. When the lever 25 moves further, the latch pin 24c is pushed in accompany with the movement of the lever 25, so that the latch plate 24b rotates clockwise against the urging force of the latch spring 24f.

When the movement of the lever 25 has been completed and the shutter 52 has been completely opened, as shown by a solid line in FIG. 3, the latch pin 24c retains at one end of the long hole 38 as well as the latch roller 24e is come out of the notched portion 24d of the carrier 3, so that the urging force of the ejecting springs 22 and 23 acts on the carrier 3 and thus, the carrier 3 moves in the ejection direction. In this state, also, the urging force acting on the levers 24 and 34 is anchored by the latch mechanism 24.

By this construction, since, as shown by two-dotted line in FIG. 4, the force in the ejection direction in accompany with the movement of the carrier 3 acts on the shafts 4a, 5a, 6a and 7a of the cams 4, 5, 6 and 7, the cams 4, 5, 6 and 7 rotate in the clockwise direction.

As a result, the shafts 4a, 5a, 6a and 7a of the cams 4, 5, 6 and 7 are moved to the lowest positions, so that the tray 2 lowers to the loading position.

Also, in this state, the acting face of a magnetic head 40 positions at the neighborhood of the recording face of the magneto-optical disk (omitted in illustration) housed in the disk cartridge 50.

Thus, when the disk cartridge 50 is inserted, the carrier 3 moves in the ejection direction as well as the tray 2 so moves that it draws an almost arcuate locus to determine the disk cartridge 50 at a standard position.

When the disk cartridge 50 mounted in the above-mentioned manner is to be ejected from the apparatus, an ejection button (described later) is pushed, and the ejecting pin 14 is moved in the insertion direction of the disk cartridge 50 by an ejection mechanism (described later) which interlockingly communicates with the ejection button. Therefore, the carrier 3 moves in the insertion direction against the urging force of the ejecting springs 22 and 23, as the cams 4, 5, 6 and 7 rotates counterclockwise in FIG. 4, whereby gradually rising the tray 2.

On the other hand, since the latch plate 24b of the latch mechanism 24 is urged in the counterclockwise direction by the latch spring 24f, the latch roller 24e drops in the notched portion 24d when the notched portion 24d of the carrier 3 moves to the position of the latch roller 24e.

At this time, the latch plate 24b rotates, the latch pin 24c pushes the lever 25, and the latch pin 24c comes out of the long hole 38 of the lever 25.

Accordingly, at the state that the tray 2 moves to the highest position, the urging force of the levers 25, 34 and the latch mechanism 24 act on, so that the disk cartridge 50 is pushed out of the tray 2. Thus, a part of the disk cartridge 50 projects out of the insertion inlet 60, thereby the disk cartridge 50 can be taken out of the tray 2.

Thus, the carrier 3 reciprocates and the tray 2 moves vertically while drawing an approximately arcuate locus, whereby the attachment and detachment of the disk cartridge 50 can be conducted.

In this embodiment, since the tray 2 lowers while pulling the disk cartridge 50 in the interior, the disk cartridge 50 can be mounted in the interior of the magneto-optical disk drive apparatus in the state that the disk cartridge 50 is pushed inward until the insertion inlet 60. Namely, there becomes no necessity of pushing the disk cartridge 5 from the insertion inlet 60 until the disk cartridge 50 reaches the interior of the magneto-optical disk drive apparatus.

Figure 5:
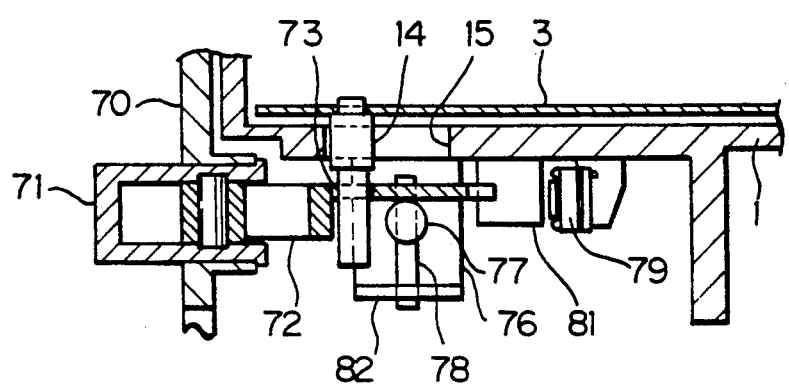
FIG. 5 is a partial vertical section view schematically showing an disc ejecting mechanism.
Figure 6:
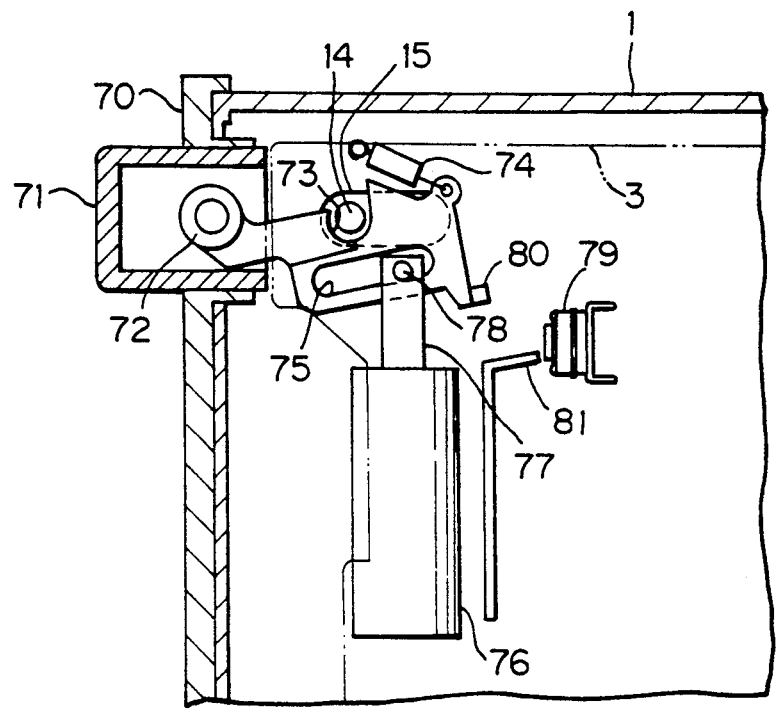
FIG. 6 is a partial horizontal section view schematically showing the ejecting mechanism.

FIGS. 5 and 6 show one example of the ejection mechanism.

In these drawings, an ejection button 71 is inserted into a front panel member 70 disposed at a side of the casing 1 where the disk cartridge 50 is inserted. The ejection button 71 is attached with an ejection arm 72 which is rockable in the right-angle direction with respect to the insertion direction of the ejection button 71.

The ejection arm 72 is formed, at an almost central portion of one end thereof, with a notched portion 73 which engages the ejecting pin 14. The other end of the ejection arm 72 which is opposite to the installing portion of the ejection button 71 is attached with a spring 74 for urging the ejection arm 72 in the engaging direction with the notched portion 73.

At the opposite side end of the notched portion 73 of the ejection arm 72 is formed with a long hole 75 through which a pin 78 attached to a tip end of an actuator 77 of a solenoid 76 is inserted.

The tip end of the ejection arm 72 is formed with a projecting portion 80 which switches on a switch 79. A guide 81 guides the switch 79 to the projecting portion 80. On the other hand, a guide 82 guides the pin 78. As a material of the ejection arm, for example, resin such as polyacetals having a small friction coefficient may be used.

Accordingly, when the solenoid 76 is in an OFF state and the actuator 77 is not drawn in, the urging force of the spring 74 acts on the ejection arm 72, whereby the ejection arm 72 rotating in the urging direction of the spring 74, so that the ejection pin 14 enters into the notched portion 73.

By this constitution, the ejection arm 72 becomes a mode where it is engageable with the ejecting pin 14, so that when the operation of pushing-in the ejection button 71 is conducted, the ejecting pin 14 is pushed to move the carrier 3, whereby the above-mentioned movement at the ejection time being made.

Figure 7:
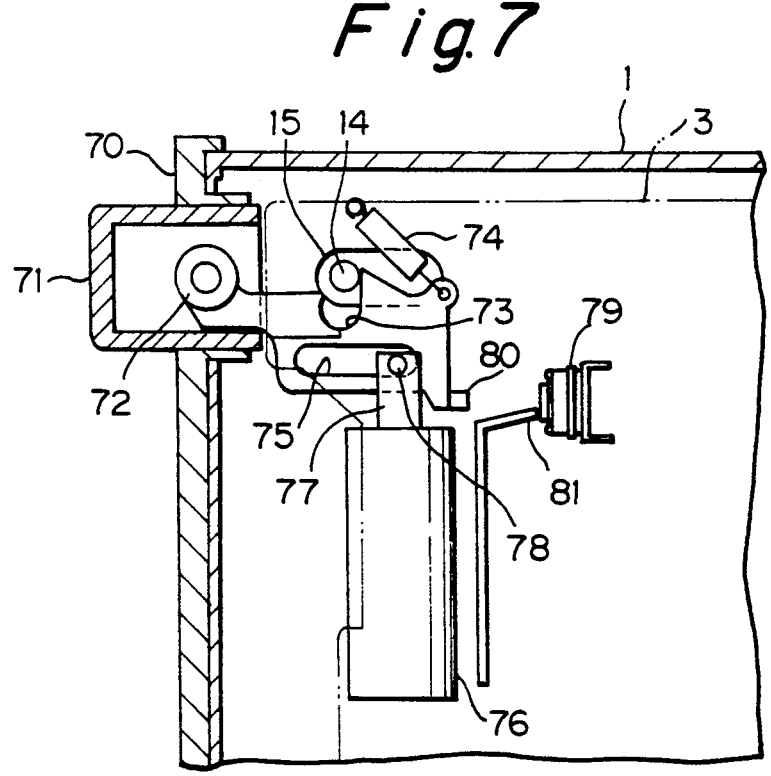
FIG. 7 is a partial horizontal section view schematically showing the disk ejecting mechanism held in the locked state.

On the other hand, when the solenoid 76 is switched ON, as shown in FIG. 7, the actuator 77 rotates the ejection arm 72 against the urging force of the spring 74 in the opposite direction with respect to the urging direction of the spring 74, whereby the ejection pin 14 being off from the notched portion 73.

By this constitution, the ejection arm 72 becomes a mode where it does not engage the ejection pin 14, so that even though the operation of pushing-in ejection button 71 is conducted, the operational force is not transmitted to the ejecting pin 14. When the pushing-in of the ejection button 71 is stopped, the urging force of the ejecting spring 74 acts on, so that the ejection arm 72 rotates in its urging direction, whereby the ejection button 71 being restored to its original state.

Figure 8:
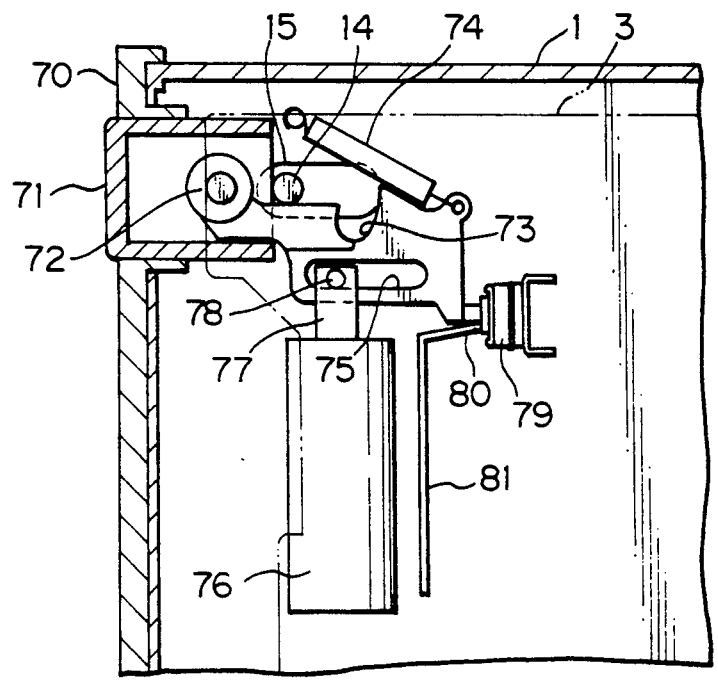
FIG. 8 is a partial horizontal section view schematically showing the state that the ejection button is operated pushed when the disk ejecting mechanism is locked.

At this time, as shown in FIG. 8, when the ejection button 71 is sufficiently pushed inward, an projection 80 of the ejection arm 72 switches on the switch 79.

Figure 9:
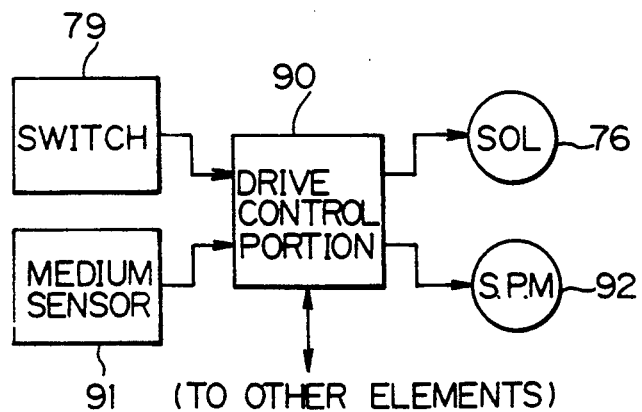
FIG. 9 is a block diagram showing a control system in the magneto-optical disk drive apparatus.

FIG. 9 shows one example of a control system of the magneto-optical disk drive apparatus.

In this drawing, a drive control portion 90 controls the movement of the magneto-optical disk drive apparatus. The drive control portion 90 is added with an on-and-off signal of the switch 79 and a detecting signal of the media-in-sensor 91 for detecting the completion of the disk cartridge 50 being mounted.

When the drive control portion 90 is given electric source and the media-in-sensor 91 conducts the detection of the completion of the disk cartridge 50 being mounted, the drive control portion 90 starts the rotation of a spindle motor 92 which drives in rotation the magneto-optical disk (omitted in illustration) which is housed in the disk cartridge 50 as well as it switches the solenoid 76 on.

By this constitution, as mentioned above, the ejection arm 72 is displaced to a mode where it does not engage the ejecting pin 14, so that even though the operation of pushing-in the ejection button 71 is conducted, the ejection movement is not be carried out.

When, in the state that the access is not carried out with respect to the magneto-optical disk, the ejection button is operated to be pushed inward and the switch is switched on, the drive control portion 90 stops the rotation of the spindle motor 92 at that point and makes the solenoid off at the timing of the rotation of the spindle motor 92 being completed.

By this constitution, as mentioned above, the ejection arm 72 is displaced to the mode where it engages the ejecting pin 14, so that when the operation of the ejection button 71 being pushed inward, the above-mentioned ejection movement is conducted, whereby the mounted disk cartridge 50 is ejected out.

On the other hand, although the switch 79 is switched on, the drive control portion 90 does not stop the spindle motor 92 and does not make the solenoid 76 to be off in a case that the access movement is conducted with respect to the magneto-optical disk or that the system in which the magneto-optical disk drive apparatus is incorporated prohibits the ejection movement.

In this case, it is effective to provide an indication lamp so as to indicate the ejection locking state and the rotating state of the spindle motor 92.

The other movements of the drive control portion 90 have not direct relationship with the present invention, so that the explanation thereof is omitted.

As described above, in the present embodiment, since the force for pushing-in the ejection button 71 is not transmitted to the ejecting pin 14; excessive force is not applied to the ejecting pin 14 and the carrier 3 even though the pushing-in operation is forcedly conducted, and therefore, any cases to damage the loading mechanism can be avoided.

At that time, moreover, when the ejection button 71 is pushed, any resisting force is not felt to the operator, so that the operator can check the ejection locking state without fail.

When the ejection button 71 is sufficiently pushed inward at the ejection locking state, the switch 79 is switched on, whereby, at the state that the system is ready for the ejection, the rotation of the spindle motor 92 being stopped as well as the absorption of the solenoid 76 being released to make the ejection possible.

For that purpose, when the spindle motor 92 rotates, it is necessary to conduct two times of the pushing-in operations of the ejection button 71. At that time, until the two time when the ejection movement is actually conducted, the spindle motor 92 completely stops and therefore, there is not conducted the ejection movement during the rotation of the spindle motor 92.

Accordingly, such an accident that the disk cartridge 50 collides with the magneto-optical disk which is housed in the disk cartridge 50 to be worn and the produced wear dust is applied to the data-recording face of the magneto-optical disk.

In the above-described embodiment, although the present invention is applied to the magneto-optical disk drive apparatus, the present invention can be similarly applied to a disk drive apparatus using an exchangeable optical recording disk.

Moreover, the spring as a means for the displacement to the mode for engaging the ejection arm and the ejecting pin and the solenoid as a means for the displacement to the mode for not engaging the ejection arm and the ejecting pin are used in this embodiment. However, it is of course that these means may be realized by different elements.

Explanation will now be made as to a second embodiment of the present invention with reference to FIGS. 10 to 17.

FIG. 10(a) shows a disk loading mechanism according to the second embodiment of according to the present invention which is applied to a magneto-optical disk drive apparatus.

Referring first to FIG. 10(a), a chassis 101 of the magneto-optical disk drive mechanism is arranged with a tray 102 which houses a later-mentioned disk cartridge, a carrier 103 which reciprocates in a direction of insertion/ejection of the disk cartridge, and a disk loading mechanism comprising cams 104, 105, 106 and 107 for connecting the tray 102 and the carrier 103 and for moving the tray 102 in the insertion/ejection direction in interlocking relation with the carrier 103.

The chassis 101 is attached with height standard pins 108, 109, 110 and 111 for regulating the height of the disk cartridge. The carrier 103 is formed with long holes 112 and 113 in the insertion direction of the disk cartridge for guiding the height standard pins 109, 111 which are aligned in the front and rear direction at the right side when they are seen in the insertion direction of the disk cartridge.

At a further forward side from the long hole 112 positioned at the forward side of the carrier 103, an ejecting pin 114 for pushing the carrier at the time of ejecting out the disk cartridge is arranged in a manner that it projects at the lower face of the carrier 103. The chassis 101 is formed with a long hole 115 for escaping the ejecting pin 114.

At the rearward of the height standard pins 108 and 109, pins 116 and 117 are provided, respectively, while long holes 118 and 119 are formed with on the carrier 103 so as to escape the pins 116 and 117. Springs 122 and 123 for acting urging force in the ejection direction on the carrier 103 are hooked between the pins 116 and 117 projecting from the long holes 118 and 119 and hooks 120 and 121 provided on the rear portion of the carrier 103.

This urging force is anchored by the latch mechanism 124 provided at the rear side of the long hole 113, in the state that the disk cartridge is not mounted.

This latch mechanism 124 comprises a shaft 124a provided on the chassis 101, a latch plate 124b rotatably provided on the shaft 124a, a latch pin 124c attached to the latch plate 124b in such a manner that it is engageable to a lever 125 provided on the tray 102, a latch roller 124e engageably provided on a notched portion 124d which is bored on the carrier 103 and a helical latch spring 124f for urging the latch plate 124b in the engaging direction. One end of the latch spring 124f engages one end of the latch plate 124b and the other end thereof engages a pin 124g provided adjacent to the shaft 124a.

At the side end of the carrier 103 are formed rising-up portions 126, 127, 128 and 129 at the front, rear, left and right positions, respectively. One-side operating shafts 104a, 105a, 106a and 107a of the cams 104, 105, 106 and 107 are fixedly inserted into the rising-up portions 126, 127, 128 and 129. The other operating shafts 104b, 105b, 106b and 107b of the cams 104, 105, 106 and 107 are fixedly inserted into holes 130, 131, 132 and 133 provided on the outside portion of the tray 102. The holes 131 and 133 are formed as long holes so as to absorb the installing accuracy.

Rocking shafts 104c, 105c, 106c and 107c formed at the opposite face to the face of the operating shafts of the cams 104, 105, 106 and 107 are fixedly inserted into holes 101c, 101d, 101e and 101f bored on the side plates 101a and 101b provided up at the side face of the chassis 101.

By this construction, the cams 104, 105, 106 and 107 are rotatably attached to the chassis 101 and interlock the tray 102 with the carrier 103, whereby the movement of the tray 102 is also regulated only in the movement direction regulated by the cams 104, 105, 106 and 107.

Moreover, projecting portions 104d, 105d, 106d and 10d are, respectively, provided on the base portions of the rocking shafts 104c, 105c, 106c and 107c of the cams 104, 105, 106 and 107 (see FIG. 10(b)), whereby eliminating a contact area with the chassis 101 to reduce friction coefficient. Furthermore, by using resin having small frictional ratio such as polyacetals as a material of the cams 104, 105, 106 and 107, it is arranged to make the frictional force on the contact faces of the cams 104, 105, 106 and 107 as small as possible.

The tray 102 is generally formed so that it embraces the disk cartridge from upper side and lateral sides. Both lower sides at housing inlet for the disk cartridge are formed so as to be bent downward.

Inside the tray 102 are rotatably provided levers 125 and 134 for opening and closing a shutter (described later) of the disk cartridge. These levers 125 and 134 are given urging force in the outward direction. Further, anchor members 135 and 136 provided, respectively, on the upper faces of the levers 125 and 134 are anchored in guiding holes 137 and 138 formed on the tray 102 in the form of a band so as to form a part of an arc, whereby regulating the movement direction of the levers 125 and 134. The levers 125 and 134 are also constructed in such a manner that one of them is lowered at one step from the other thereof so that they cross in the course of their movement ranges.

The lever 125 is formed with a long hole 138 through which the latch pin 124c inserts and a notched portion 139 for making the long hole 138 pass the latch pin 124c.

On the upper face of the tray 102 is installed a magnetic head 140 for generating an auxiliary magnetic field with the movement range of an optical pickup head. Inside the tray 102 are arranged junk members 141 and 142 at its both sides for holding down the disk cartridge and regulating the height of the latter. The junk members 141 and 142 are urged by plate springs 143 and 144, respectively (in the drawing, the plate spring 144 is not seen).

At the forward and lower side of the chassis 101 are provided media sensor 145, 146 and 147 for detecting the disk cartridge being mounted and the kinds of the magneto-optical disks (omitted in the drawing) housed in the disk cartridge, and a sensor substrate 149 attached with a light protecting sensor 148 for detecting whether the mounted disk cartridge is in the state to be recorded. The chassis 101 is formed with holes 150, 151 to escape the media sensors 145, 146 and 147 and the light protecting sensor 148. The holes 150, 151 are blocked up by the sensor substrate 149.

Figure 11A:
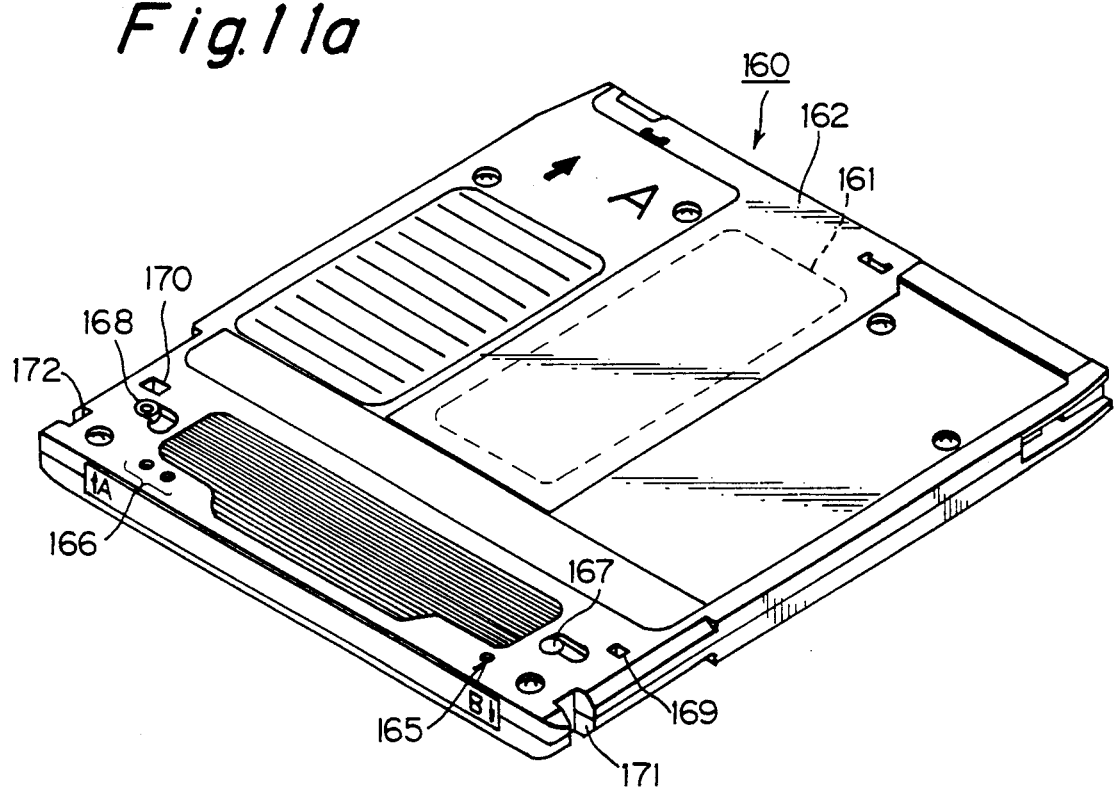
FIG. 11(a) is a perspective view showing a disk cartridge which is substantially the same as that shown in FIG. 10(a)
Figure 11B:
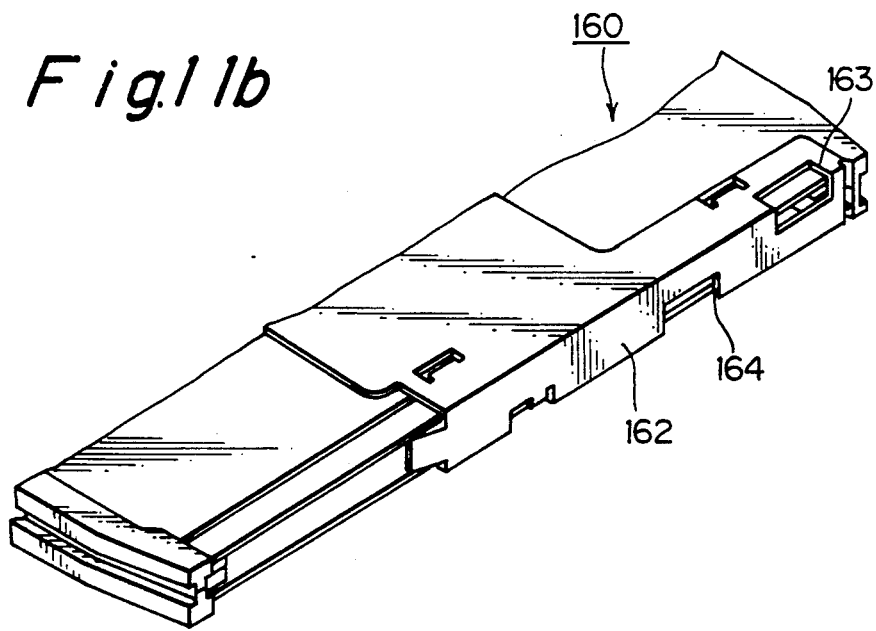
FIG. 11(b) is a partial perspective view showing a shutter of the disk cartridge shown in FIG. 11(a)

FIGS. 11(a) and 11(b) show one embodiment of the disk cartridge.

In these drawings, a long access window 161 is formed at almost center of the disk cartridge 160 in the insertion direction. A shutter 162 for opening and closing the access window 161 is attached to the disk cartridge 160 in such a manner, that the shutter 162 can be folded back centering the top end of the disk cartridge 160.

The shutter 162 positioned at the top end of the disk cartridge 160 is formed with opening portions 163 and 164 into which the levers 125 and 134 are inserted.

At the rear end of the disk cartridge 160, media marks 165, 166 for showing the properties of A/B faces of the magneto-optical disk housed therein are formed. At the side forward than the media marks 165, 166, light protecting notches 167, 168 for prohibiting data recording into the magneto-optical disk are formed. Standard holes 169, 170 are to be inserted by the standard pins 108, 109. Notches 171, 172 are provided so that a handling mechanism which treats the disk cartridge 160 by means of an automatic exchange system can grasps the disk cartridge 160.

Figure 12:
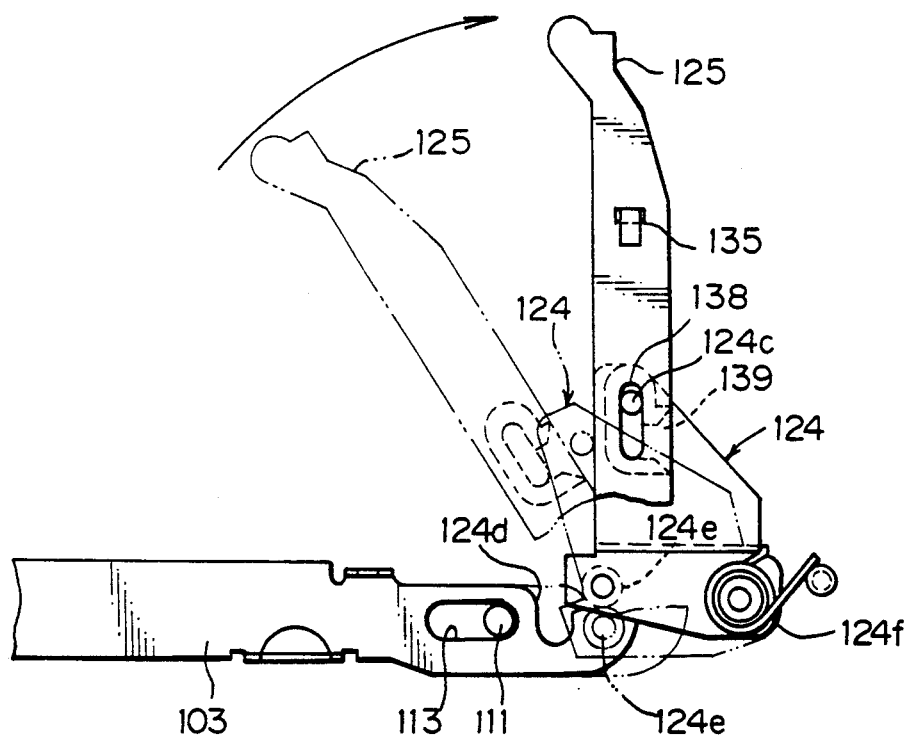
FIG. 12 is a schematical view for explaining the movement of a latch mechanism.

Under the above-mentioned construction, when the disk cartridge 160 is in the state that it is not housed in the tray 102 as shown by two-dotted line in FIG. 12, the latch roller 124e of the latch mechanism 124 is in the state that it drops in the notched portion 124d of the carrier 103, thereby the urging force of the ejecting springs 122 and 123 being anchored.

Moreover, in this state, the carrier 103 moves to the limit position of the insertion direction at the state of the insertion-waiting time, so that, as shown by a solid line in FIG. 13, the shafts 104b, 105b, 106b and 107b of the cams 104, 105, 106 and 107 are positioned at the highest positions and the housing inlet of the tray 102 for the disk cartridge 160 corresponds to the height of the insertion inlet 176 formed at a front panel 175 disposed at the front face of the chassis 101.

In this state, when the disk cartridge 160 is inserted into the tray 102, the levers 125 and 134 are inserted into the opening portions 163 and 164 of the shutter 162 and the levers 125, 134 are inserted into the opening portions 163, 164 and the shutter 162 is gradually opened and at the same time, the latch pin 124c enters into the long hole 138 through the notched portion 139 of the lever 125 in the course of the movement of the shutter 162. When the lever 125 moves further, the latch pin 124c is pushed inward accompany with the movement of the lever 125, so that the latch plate 124b rotates clockwise against the urging force of the latch spring 124f.

At the time when the movement of the lever 125 has completed and the shutter 162 has been completely opened, as shown by a solid line in FIG. 12, the latch pin 124c retains at one end of the long hole 138 as well as the latch roller 124e is come out of the notched portion 124d of the carrier 103, so that the urging force of the ejecting springs 122, and 123 acts on the carrier 103 and thus, the carrier 103 moves in the ejection direction. In this state, also, the urging force acting on the levers 124 and 135 is anchored by stopped by the latch mechanism 124.

By this construction, since, as shown by two-dotted line in FIG. 13, the force in the ejection direction in accompany with the movement of the carrier 103 acts on the shafts 104a, 105a, 106a and 107a of the cams 104, 105, 106 and 107, the cams 104, 105, 106 and 107 rotate in the clockwise direction.

As the result, the shafts 104a, 105a, 106a and 107a of the cams 104, 105, 106 and 107 are moved to the lowest positions, so that the tray 102 lowers to the loading position.

Also, in this state, the acting face of a magnetic head 140 positions at the neighbourhood of the recording face of the magneto-optical disk housed in the disk cartridge 160.

Thus, when the disk cartridge 160 is inserted, the carrier 103 moves in the ejection direction as well as the tray 102 so moves that it draws an almost arcuate locus to determine the disk cartridge 160 at a standard position.

When the disk cartridge 160 which is mounted in the above-mentioned manner is ejected out, an ejection button (described later) is pushed inward and the ejecting pin 114 is moved in the insertion direction of the disk cartridge 160 by an ejection mechanism (described later) which interlockingly communicates with the ejection button, the carrier 103 moves in the insertion direction against the urging force of the ejecting springs 122 and 123 as well as the cams 104, 105, 106 and 107 rotates counterclockwise in FIG. 13, whereby the tray 102 gradually rising.

On the other hand, since the latch plate 124b of the latch mechanism 124 is urged in the counterclockwise direction by the latch spring 124f, the latch roller 124e drops in the notched portion 124d when the notched portion 124d of the carrier 103 moves to the position of the latch roller 124e.

At this time, the latch plate 124b rotates, the latch pin 124c pushes the lever 125 and the latch pin 124c comes out of the long hole 138 of the lever 125.

Accordingly, in the state that the tray 102 moves to the highest position, the urging force of the levers 125, 134 and the latch mechanism 124 act on, so that the disk cartridge 160 is pushed out of the tray 102. Thus, a part of the disk cartridge 160 projects out of the insertion inlet 176, thereby the disk cartridge 160 can be taken out from the tray 102.

Thus, the carrier 103 reciprocates and the tray 102 moves vertically while drawing an approximately arcuate locus, whereby the attachment and detachment of the disk cartridge 160 can be conducted.

In this embodiment, since the tray 102 lowers while pulling the disk cartridge 160 in the interior, the disk cartridge 160 can be mounted in the interior of the magneto-optical disk drive apparatus in the state that the disk cartridge 160 is pushed into the insertion inlet 176. Namely, there becomes no necessity of pushing the disk cartridge 160 in from the insertion inlet 176 until the disk cartridge 160 reaches the interior of the magneto-optical disk drive apparatus.

FIG. 14 shows a seal construction of the second embodiment of the present invention, in which the chassis cover 180 is constituted in such a shape that the lower end portion thereof abuts the upper end portion of the chassis 101, and the chassis cover 180 is screwed at its end portion to the chassis 101 by an screw 181. At the front portion of the chassis cover 180, an insertion inlet 182 for receiving the disk cartridge 160 is formed. The insertion inlet 182 is rotatably provided in its interior with a door 183 which is urged in the closure direction. Protruded portions 184, 185 (the protruded portion 184 does not appear in this drawing) which are protruded on the both ends of the insertion inlet 182 are fixedly inserted into holes 186, 187 formed at the both ends positioned at the front end of the chassis 101, so that the width dimension of the door 183 installed on the chassis 101 is set to be same as or slightly smaller than the outer dimension of the disk cartridge 160.

Moreover, the insertion inlet 182 is so formed as to surround the outer face of the disk cartridge 160 to be inserted, and the respective dimensions of the insertion inlet 182 are so arranged to the extent that its width is slightly larger than the width dimension of the outer appearance of the disk cartridge 160, and that the vertical distance of the insertion inlet 182 can almost contact the upper and lower faces of the disk cartridge 160 when the disk cartridge is inserted and mounted on a predetermined position.

The lower portion of the insertion inlet 182 is formed as a stepped portion 188. The side end face of the stepped portion 188 contact the side end portion at the upper end face of the wall 189 which is raised up at the front face of the chassis 101. The height of the upper end face of the wall 189 of the chassis 101 is set to be very slightly smaller than the standard height of the height standard pins 108, 109, 110 and 111.

The upper end face of the side plates 101a and 101b of the chassis 101 and lower end face of the chassis cover 180 are formed as stepped portions 101aa and 180a so that they can mesh to each other, whereby improving the sealing degree at these portions. (see FIG. 15)

As described above, the chassis 101 is installed with the chassis cover 180 and the insertion inlet 182 through which the disk cartridge 160 is detachable is blocked up by the door 183, so that the interior of the chassis 101 can be sealed from the outside. The chassis 101 is fixed to a frame 190 by interposing rubber vibration insulators 191, 192, 193 and 194 therebetween, in a sealed state.

Attached to the front face of the frame 190 is a front panel 175. The front panel 175 is formed at the lower side thereof with a wind-hole 195 for intaking the atmosphere. An ejection button 196 is projected outward from the front panel 175.

Figure 16:
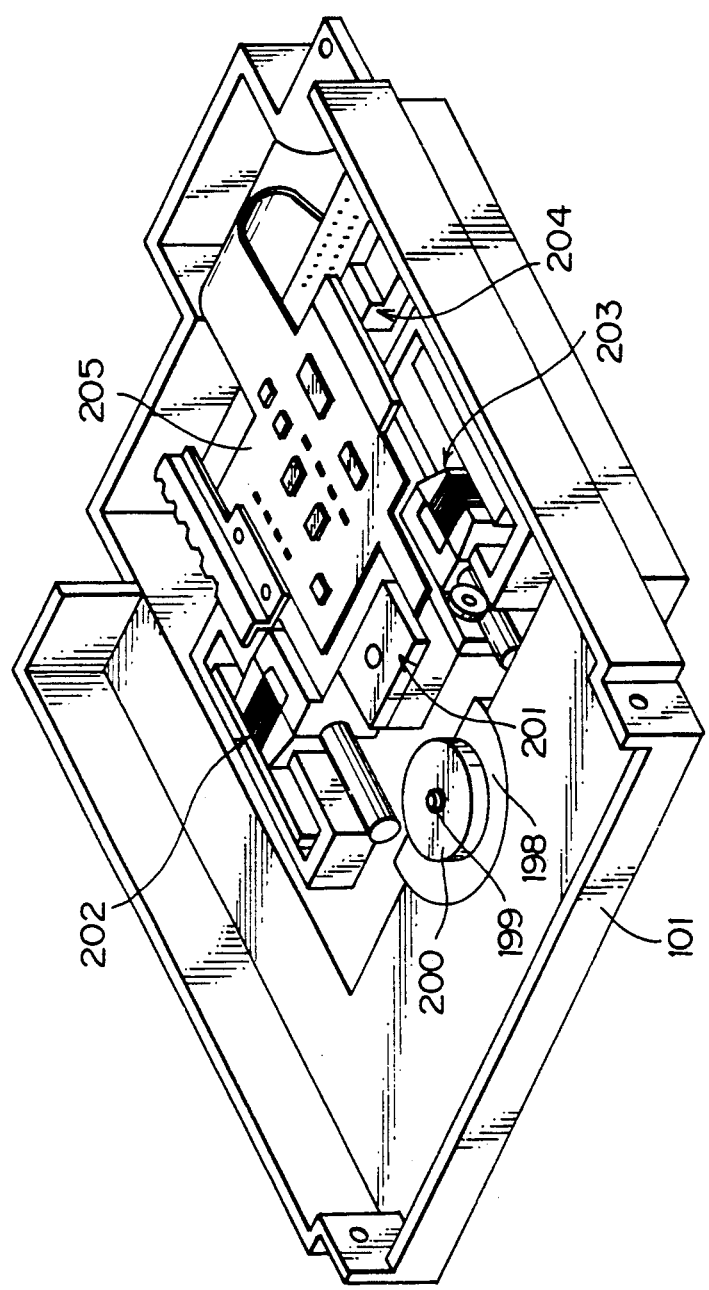
FIG. 16 is a perspective view schematically showing elements enclosed in the chassis.
Figure 15:
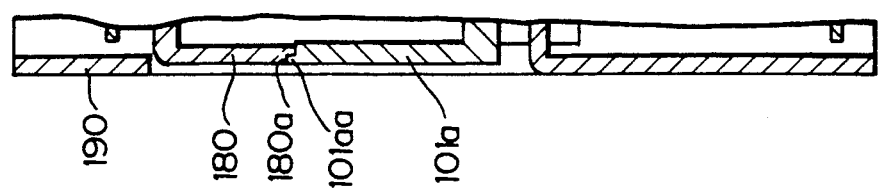
FIG. 15 is a partial section view schematically showing an example of a connecting state of a chassis with a chassis cover.

As shown in FIG. 16, in the interior of the chassis 101 are, as an access mechanism for recording and/or reproducing data in or from the magneto-optical disk, housed a spindle motor 198 for driving in rotation the magneto-optical disk, a turn table 200 attached to a shaft 199 of the spindle motor 198 and for fixing the magneto-optical disk, an optical pickup head 201, seek motors 202, 203 for moving the optical pickup head 201 and a linear encoder 204 for detecting approximate position of the optical pickup head 201.

Figure 17:
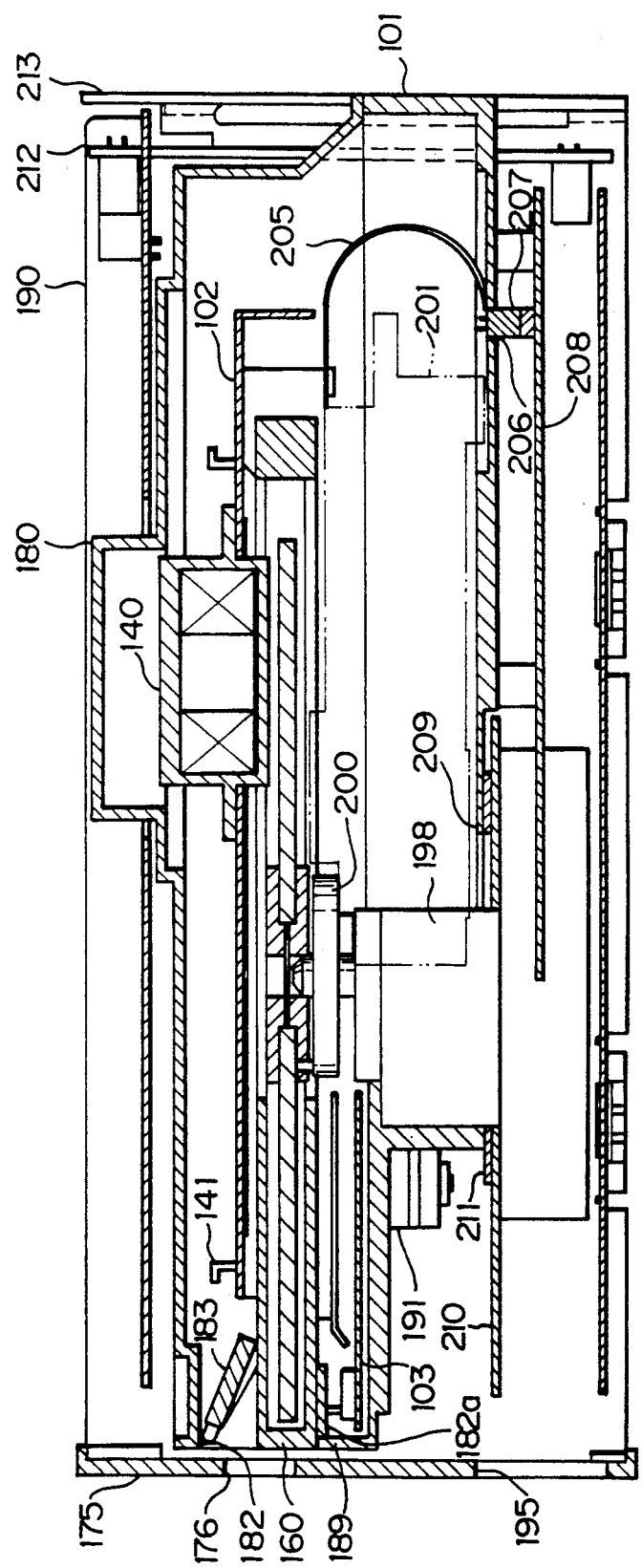
FIG. 17 is a section view schematically showing the disk cartridge which is mounted on a predetermined position.

A flexible print substrate 205 is attached to the upper portion of the optical pickup head 201. At the flexible print substrate 205 are loaded minimally necessary circuits for the drive of the optical pickup head 201, seek motors 202, 203 and linear encoder 204. The wiring of the flexible print substrate 205 is, as shown in FIG. 17, connected to a pin of a connector 207 which projects from a hole 206 bored at the lower face of the chassis 101.

The connector 207 is connected to a control substrate 208 arranged at the lower face of the chassis 101. The hole 206 is blocked up by the flexible print substrate 205, whereby the seal can be held at this portion.

The spindle motor 198 is installed in such a manner that it projects from the opening portion 209 of the chassis 101. Between the chassis 101 and the substrate 210 of the spindle motor 198 is inserted a torus-shaped sealing member 211, whereby the sealing property at this portion can be increased.

The drive circuits of motors housed in the chassis 101 and control circuits thereof are loaded on a circuit substrate 212 arranged at a space between the rear end portion of the chassis 101 and the rear portion of the frame 190. The circuit substrate 212 is connected to a heat dissipation plate 213 to dissipate heat.

In the state that the disk cartridge 160 is mounted, the lower face of the rear end portion of the disk cartridge 160 almost contacts the upper end face of the wall 189 of the chassis 101. The notched portions 171, 172 of the disk cartridge 160 contact the lower face, 182a of the insertion inlet 182 of the chassis 101 and to be sealed up. The lower end face of the door 183 contacts the upper face of the disk cartridge 160 to hold the sealing degree at this portion. The side face of the disk cartridge 160 is almost contacts the inner side face of the insertion inlet 182 and the sealing degree at this portion is held.

Thus, even when the disk cartridge 160 is loaded, the sealing degree between the disk cartridge 160 and the chassis 101 is held, whereby almost prohibiting the invasion of the atmosphere from a gap between the disk cartridge 160 and the chassis 101.

The impact force acting on the chassis 101 is absorbed by the rubber vibration insulators 191, 192, 193 and 194, so that even if such an impact force is applied, the sealing degree with respect to the interior of the chassis 101 does not change without the gap between the chassis 101 and the members surrounding the chassis 101 being changed.

Under the above-described construction, since the access mechanism which is housed in the chassis 101 is in a constitution which is always sealed from the outside, the atmosphere does not almost invade into the access mechanism even when the atmosphere is flown into the interior of the frame 190 for the forced cooling, whereby preventing dust from being attached on the optical parts of the optical pickup head.

A great heat source such as the drive circuits of the access mechanism and control circuits thereof is incorporated to a circuit substrate 212 arranged at the rear portion of the frame 190, by which the heat filled in the interior of the chassis 101 can be controlled to some extent. Moreover, the heat in the interior of the chassis 101 is released to the outside through an outer faces of the chassis 101 and the chassis cover 180, so that the temperature in the interior of the chassis 101 is suppressed within the permissible temperatures of the access mechanism and the magneto-optical disk.

In the case that the material of the chassis 101 is constituted by a die-casting metal or alloy, the dimension accuracy of each portion can be raised, so that the sealing degree can be improved.

In the case that the material of the chassis cover 180 is constituted by a plastics, the complicated shape can be readily realized, so that even if special sealing members are not provided, the sealing degree can be made satisfactory. The installations of the chassis cover 180 to the chassis 101 and of the door 183 to the chassis cover 180 can be facilitated.

Although the second embodiment of the present invention is applied to the magneto-optical disk drive apparatus. However, the present invention may be similarly applied to an optical disk drive apparatus.

Further, in the second embodiments, the insertion inlet of the chassis cover is constituted to surround the whole surrounding of the disk cartridge to be inserted. However, the similar effects can be obtained even by eliminating the member at the lower face of the insertion inlet.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. A optical disk drive apparatus comprising:

a disk loading mechanism for detachably mounting, at a predetermined position in the apparatus, an exchangeable disk cartridge enclosing an optical recording medium;

an access mechanism including an optical pickup head for recording data on and for reproducing data from the optical recording medium enclosed within the disk cartridge and driving means for moving the optical recording medium with respect to the optical pickup head;

a chassis with a cover for containing said disk loading mechanism and said access mechanism, said chassis having an opening portion and a hole; and a frame surrounding said chassis and supporting said chassis, said driving means installed in said opening portion to project from said opening portion and to close said opening portion, and having a connector positioned to pass through and close said hole, thereby sealing said chassis.

2. An optical disk drive apparatus according to claim 1, said driving means comprising a spindle motor having a substrate, said substrate being fixed to said chassis through a torus-shaped sealing member.

3. An optical disk drive apparatus according to claim 1, said frame further comprising a front panel surrounding said chassis and supporting said chassis.

4. An optical disk drive apparatus according to claim 1, wherein a control substrate is disposed below said chassis in said frame and is connected with said connector, said front panel being provided with an air intake hole below said chassis.

5. An optical disk drive apparatus according to claim 1, wherein said driving means seals said chassis when the disk cartridge is mounted at the predetermined position.

6. An optical disk drive apparatus according to claim 1, further comprising means for cooling said optical pickup head and/or said driving means.

7. An optical disk drive apparatus according to claim 1, wherein said cover has an aperture at a front face thereof through which the disk cartridge is inserted.

8. An optical disk drive apparatus according to claim 7, further comprising a door at the front face of the cover for opening and closing the aperture of the chassis cover.

* * * * *